(12) United States Patent
Lestido Sarasola

(10) Patent No.: US 10,716,285 B2
(45) Date of Patent: Jul. 21, 2020

(54) SET OF PANELS AND CHANNELS FOR PROTECTING LIVESTOCK DURING TRANSPORTATION

(71) Applicant: José Manuel Lestido Sarasola, Montevideo (UY)

(72) Inventor: José Manuel Lestido Sarasola, Montevideo (UY)

(*) Notice: Subject to any disclaimer, the term of this patent is extended or adjusted under 35 U.S.C. 154(b) by 213 days.

(21) Appl. No.: 16/061,211

(22) PCT Filed: Dec. 7, 2016

(86) PCT No.: PCT/ES2016/070867
§ 371 (c)(1),
(2) Date: Jun. 11, 2018

(87) PCT Pub. No.: WO2017/098072
PCT Pub. Date: Jun. 15, 2017

(65) Prior Publication Data
US 2018/0359986 A1  Dec. 20, 2018

(30) Foreign Application Priority Data
Dec. 9, 2015  (UY) .......................................... 36425

(51) Int. Cl.
*A01K 1/00* (2006.01)
*B60P 3/04* (2006.01)

(52) U.S. Cl.
CPC .............. *A01K 1/0035* (2013.01); *A01K 1/00* (2013.01); *B60P 3/04* (2013.01)

(58) Field of Classification Search
CPC ......... B60P 3/04; A01K 1/0272; A01K 29/00; A01K 1/0035; A01K 1/0088; A01K 1/02; A01K 1/0236; A01K 1/0613; A01K 3/00

USPC .............. 119/400, 405, 512, 843, 502, 403; 296/24.31
See application file for complete search history.

(56) References Cited

U.S. PATENT DOCUMENTS

| | | | | |
|---|---|---|---|---|
| 3,894,515 A | * | 7/1975 | Plyler | A01K 29/00 119/847 |
| 8,794,190 B1 | * | 8/2014 | Evers | A01K 29/00 119/400 |
| 8,910,593 B2 | * | 12/2014 | Kell | A01K 1/0236 119/400 |
| 9,260,047 B2 | * | 2/2016 | Distelrath | B60P 3/04 |
| 9,591,828 B2 | * | 3/2017 | Hampel | A01K 1/0088 |
| 2002/0179022 A1 | * | 12/2002 | Linn | A01K 1/0613 119/729 |
| 2017/0303500 A1 | * | 10/2017 | Kennedy | A01K 1/0613 |

* cited by examiner

*Primary Examiner* — Yvonne R Abbott-Lewis
(74) *Attorney, Agent, or Firm* — Muncy, Geissler, Olds & Lowe, P.C.

(57) ABSTRACT

A set of panels for protecting livestock during transportation, for use in a lorry with a cage for carrying livestock having railings and a guillotine door, comprising: a plurality of fixed panels, and four mobile panels, wherein the fixed panels comprise one or more layers of flexible material and a backing plate made of rigid material, to be arranged forming a horizontal strip along the inner walls of the cage railings, and wherein the mobile panels comprise pivoting wings that can adopt a folded position and an unfolded position, and wherein said mobile panels are arranged at the sides of the guillotine door, two on the inside of the cage and two on the outside thereof.

10 Claims, 7 Drawing Sheets

SET OF PANELS AND CHANNELS FOR PROTECTING LIVESTOCK DURING TRANSPORTATION

FIELD OF THE INVENTION

The present invention relates to a set of panels for protecting livestock during transportation. More specifically, the invention relates to a set of panels that prevents or reduces the development of bruises or similar injuries on beef cattle due to the animals bumping against the edges of a guillotine door frame and/or against the edges of a cage during a livestock loading, unloading and/or transport operation.

BACKGROUND OF THE INVENTION

When beef cattle is transported from the farms to the slaughter plants, a large number of bruises and injuries develop in the animals due to the fact that they hit or bump against the cage railings and/or the edges of the cage guillotine doors. These bruises and other injuries are detrimental to the quality of the product and, therefore, they have to be removed from the carcass through a process of removal, thus generating an economic loss.

Due to this problem that is widely known in the art, a number of potential solutions have been put forward in order to reduce or prevent the development of bruises and other injuries during beef cattle transportation.

One of the protection systems which is known in the market and is commercially available comprises placing rollers on a vertical shaft parallel to the guides of the guillotine door, both on the outer side of the cage and in front of the guides, in such a way as to prevent the animals from bumping against the guide metal edges. Due to the fact that these rollers are mounted on a shaft that is fixed in the cage, the rollers cannot be placed in the inner side thereof, as they would take up a volume inside the cage, and, since the animals would be inside the cage, and the cage would be moving, the animals could bump against such rollers, which could lead to bruising. In addition, although this roller system reduces to some extent the injuries animals might suffer during loading operations, such system provides no protection during unloading operations. This is a major shortcoming of this system, since protection is even more necessary during the unloading operation, due to the fact that, when animals are loaded, they are arranged in a row and are led towards the door of the loading platform, while, when animals are unloaded, they are grouped in an unarranged way at the door, which causes a greater number of bumps and consequently a greater number of bruises and injuries.

Apart from this, since the rollers have to be located near the guides, their diameters have to be small, but since at the same time they must bear great impacts, they should also be made of a solid and rigid material. As a result of this, the rollers have a small diameter and they are made of rigid material, which provides little protection against bruising given the fact that, if animals impact or bump against them, bruises and injuries will develop on their body due to the rollers' rigidity and diameter.

Some alternative systems of livestock transportation are known in the art. One of these systems is the one disclosed in French patent application FR2920715, Cosnet Societe Par Actions Simplifiee, 13 Mar. 2009, relating to a trailer for carrying livestock from one farm to another, where there is a loading platform. Said trailer comprises a system of railings and a ramp that can be unfolded, one on each side of the cage door, and a pivoting ramp. For the loading and unloading operations, the railings are opened and unfolded, in order to guide the animals into the cage, and the ramp is folded upwards, acting as the trailer's door. This system is not applicable to the type of operation that is a standard in the transport of beef cattle to slaughter plants, since the farms and plants have loading platforms with their own railings. In addition, this trailer needs to have a low floor so that the ramp slope is not too steep, and therefore the trailer has medium-sized wheels, which limits the total gross weight that can be carried.

Another alternative system for transporting livestock is the one disclosed in Chinese patent application CN 102303558 (A), Inst Animal Science & Veterinary Medicine Shandong Aas, 4 Jan. 2012. Said patent application discloses a system to reduce injuries and/or bruises caused to animals during transport, by isolating each animal in an individual cage. Although this system is effective for preventing animals from bumping against each other during transport, it is not economically feasible, due to the fact that the volume taken up by the individual cages means that the loaded vehicle can carry many fewer animals than in conventional cages. For this reason, the transport cost per livestock unit is high. In addition, this system does not protect animals from impacts against the railings.

Therefore, a protection system is needed for protecting livestock during loading, transport, and unloading operations, reducing or preventing the development of injuries or bruises in the animals during such operations, and not having a negative impact on the effectiveness thereof.

BRIEF DESCRIPTION OF THE INVENTION

In view of the above, it is an object of the present invention to provide a set of protection panels, both fixed and mobile, to protect livestock against injuries and bruising which may occur during loading, transport, and unloading operations.

The present invention discloses a set of panels for protecting livestock, comprising a plurality of mobile panels for channeling livestock, provided on both sides of a cage guillotine door, and a plurality of impact-absorbing fixed panels making up a strip of flexible material provided along all vertical surfaces inside the cage, at hip, rib and shoulder height. This set of protection panels reduces or prevents harm caused by the animals' bodies bumping against the edges of the guillotine door guides, and it cushions the animal impacts against the cage railings during transport. This set of protection panels not only helps preventing or reducing injuries and bruises, but also reducing the animal stress level produced by the transport operation to the slaughter plants, thus improving the quality level of the final product.

Therefore, it is an object of the present invention to provide a set of panels for protecting livestock during transportation, for use in a lorry with a cage for carrying livestock having railings and a guillotine door, comprising:
  a plurality of fixed panels, and
  four mobile panels,
  wherein the fixed panels comprise one or more layers of flexible material and a backing plate made of rigid material, to be arranged forming a horizontal strip along the inner walls of the cage railings, and
  wherein the mobile panels comprise pivoting wings that can adopt a folded and an unfolded position, to be arranged on the sides of the guillotine door, two in the inside of the cage and two on the outside thereof.

In a preferred embodiment of the present invention, the backing plate made of rigid material is a recycled plastic plate, and the one or more layers of flexible material comprise a layer of recycled rubber arranged between two plates of micro rubber.

In a preferred embodiment of the present invention, each of the mobile panels comprises a mounting plate, a pivoting wing, and an actuator, wherein the mounting plate is fastened to the cage railing by suitable securing means, the wing is linked at one end in a pivoting way to the mounting plate by anchors, and the actuator is linked to the mounting plate and the wing, thus driving the pivoting movement thereof.

In a preferred embodiment of the present invention, each of the mobile panels arranged in the inner side of the cage additionally comprises a second pivoting wing, linked at one end in a pivoting way to the first pivoting wing, and linked at its other end to the mounting plate by a slider.

In a more preferred embodiment of the present invention, the actuator is a pneumatic cylinder driven by a compressed-air system.

In a preferred embodiment of the present invention, the compressed-air system that drives the pneumatic cylinder is a compressed-air system that is part of the lorry itself.

In a preferred embodiment of the present invention, the guillotine door and the mobile panels are operated by means of a sealed control board.

In a more preferred embodiment of the present invention, an 'activated lock' signal sent out while the guillotine door is opened prevents the guillotine door from closing when the mobile panels are in the unfolded position.

DETAILED DESCRIPTION OF THE INVENTION

Figure 1:
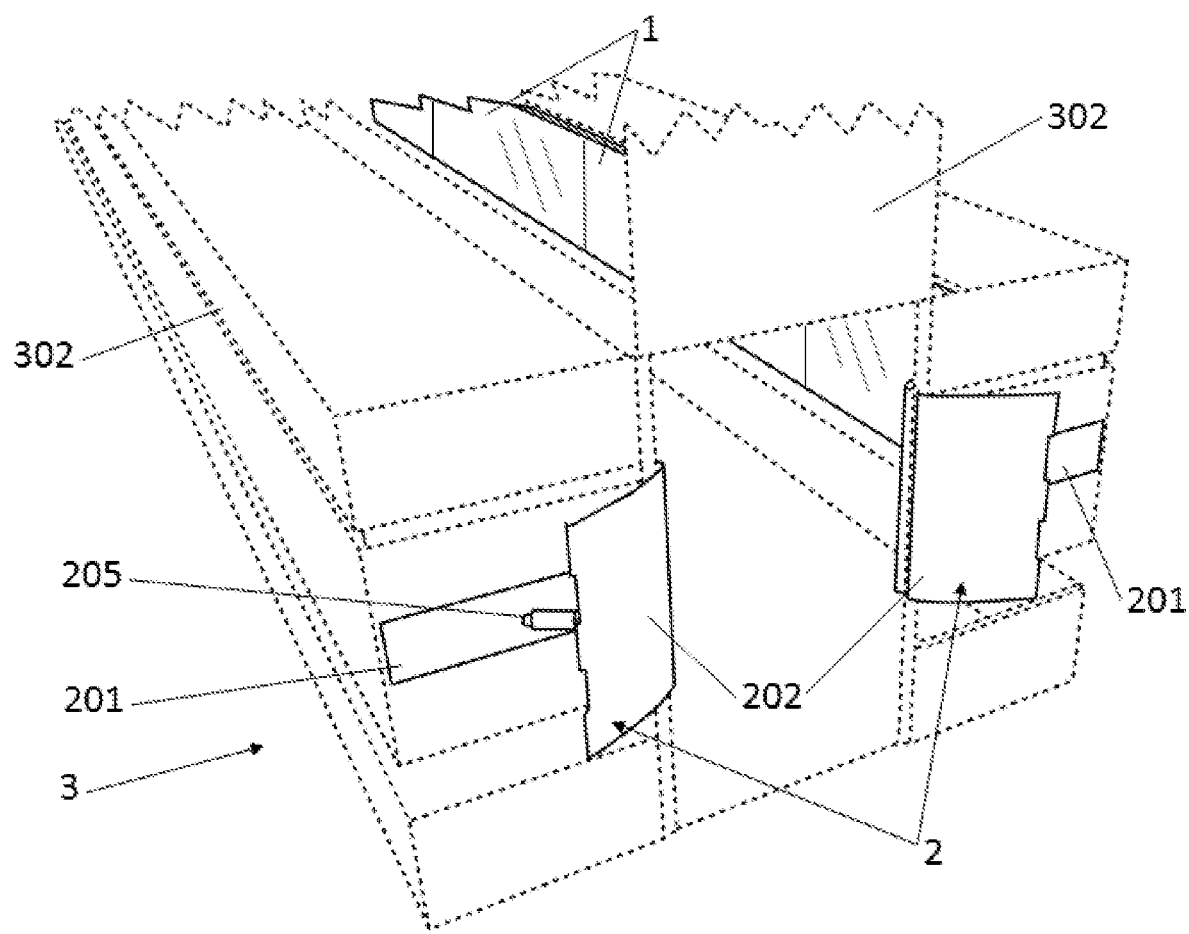
FIG. 1 is a perspective outside view of the set of protection panels of the present invention, mounted on the cage of a lorry for transporting livestock, in the opened or loading/unloading position.
Figure 2:
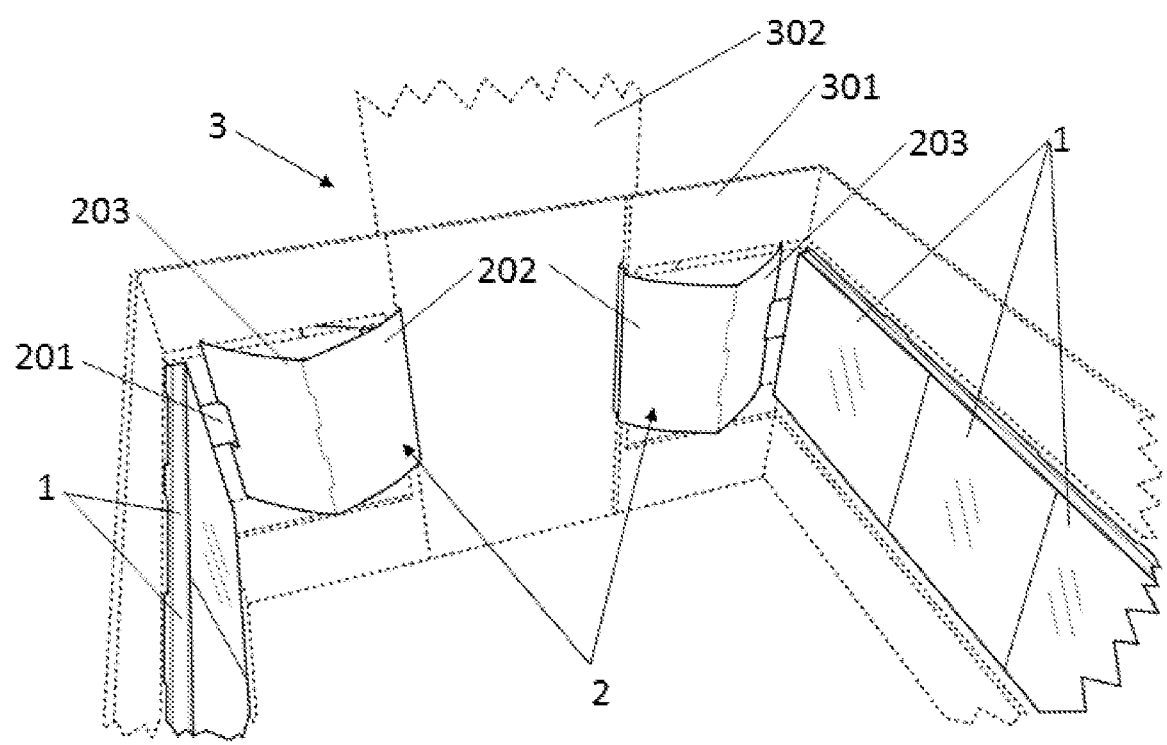
FIG. 2 is a perspective inside view of the set of protection panels of the present invention, mounted on the cage of a lorry for transporting livestock, in the opened or loading/unloading position.
Figure 3:
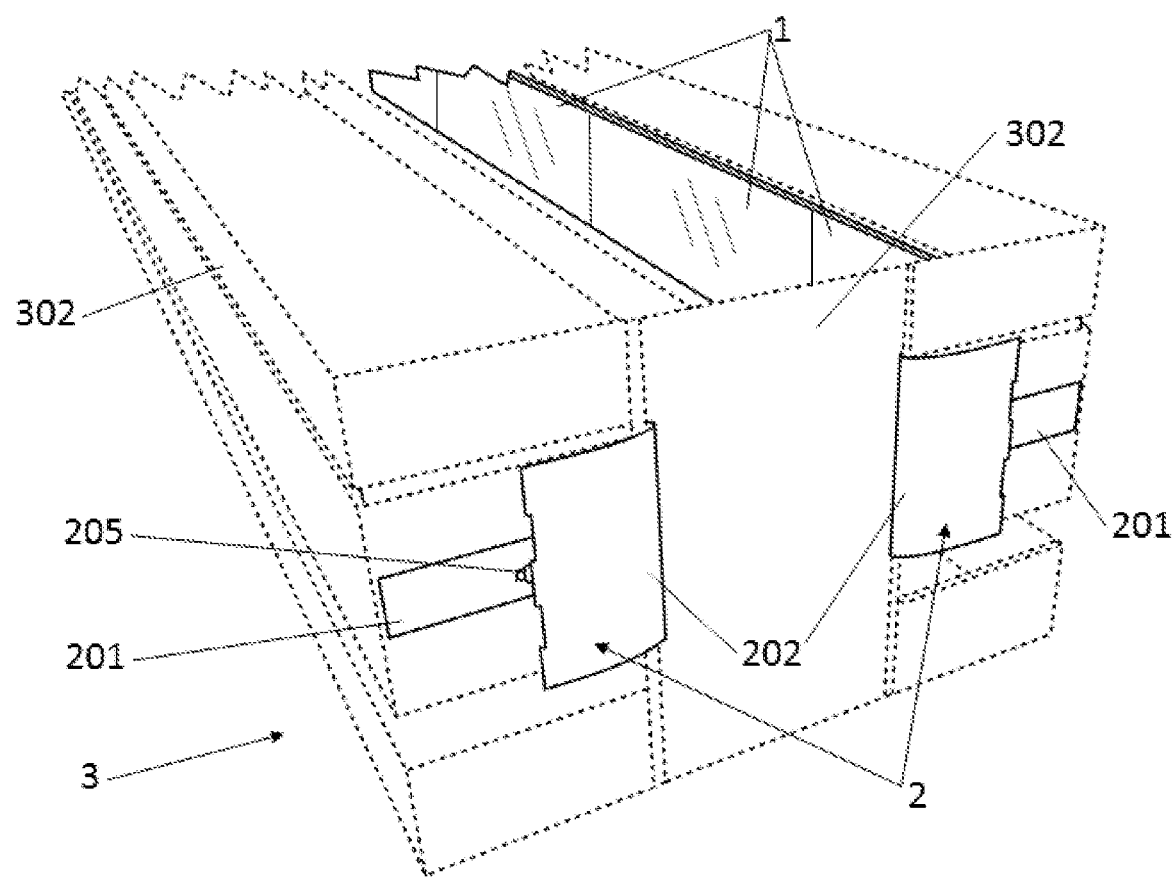
FIG. 3 is a perspective outside view of the set of protection panels of the present invention, mounted on the cage of a lorry for transporting livestock, in the closed or transporting position.
Figure 4:
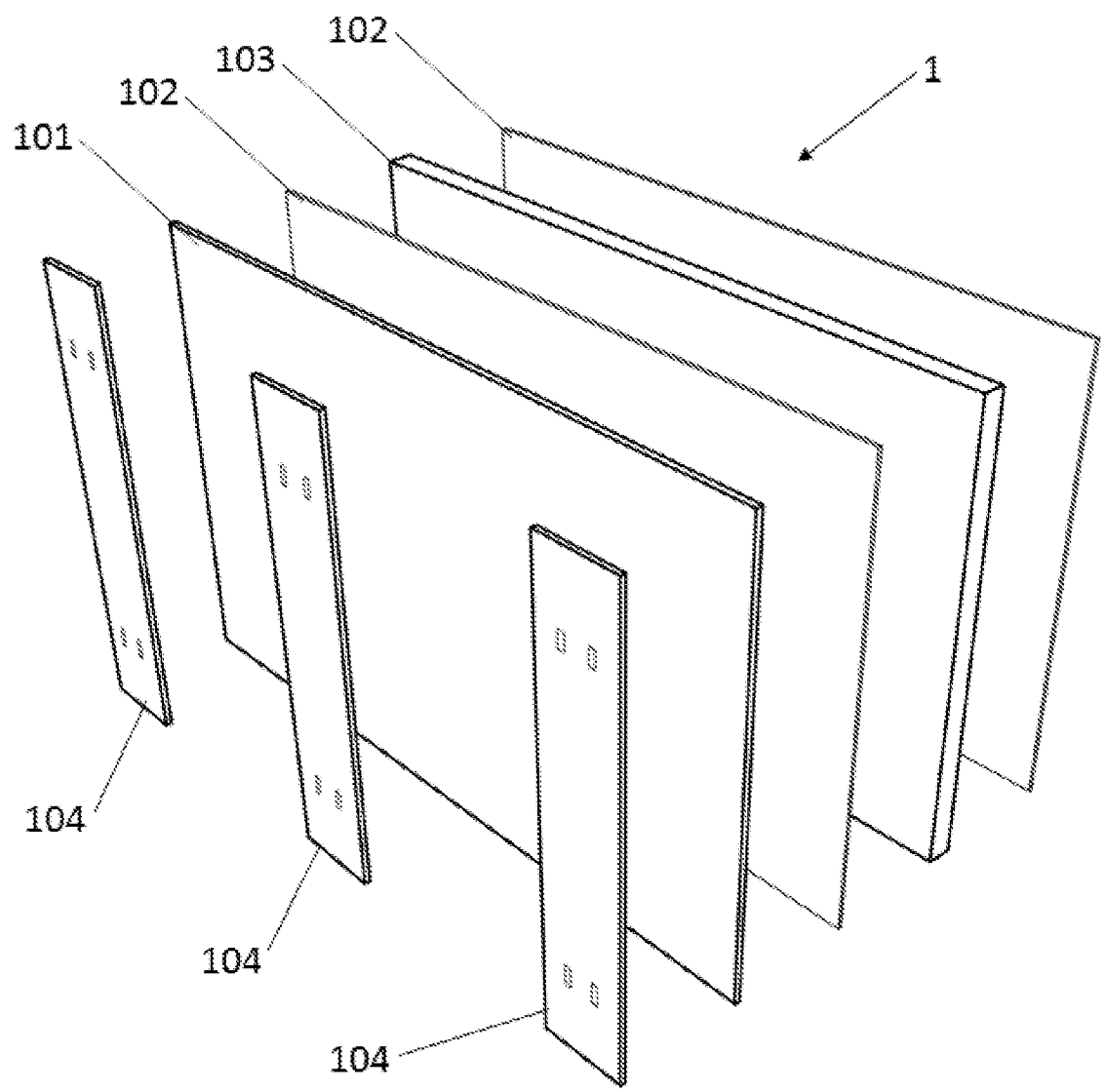
FIG. 4 is a perspective exploded view of a fixed panel of the set of protection panels of the present invention.
Figure 5:
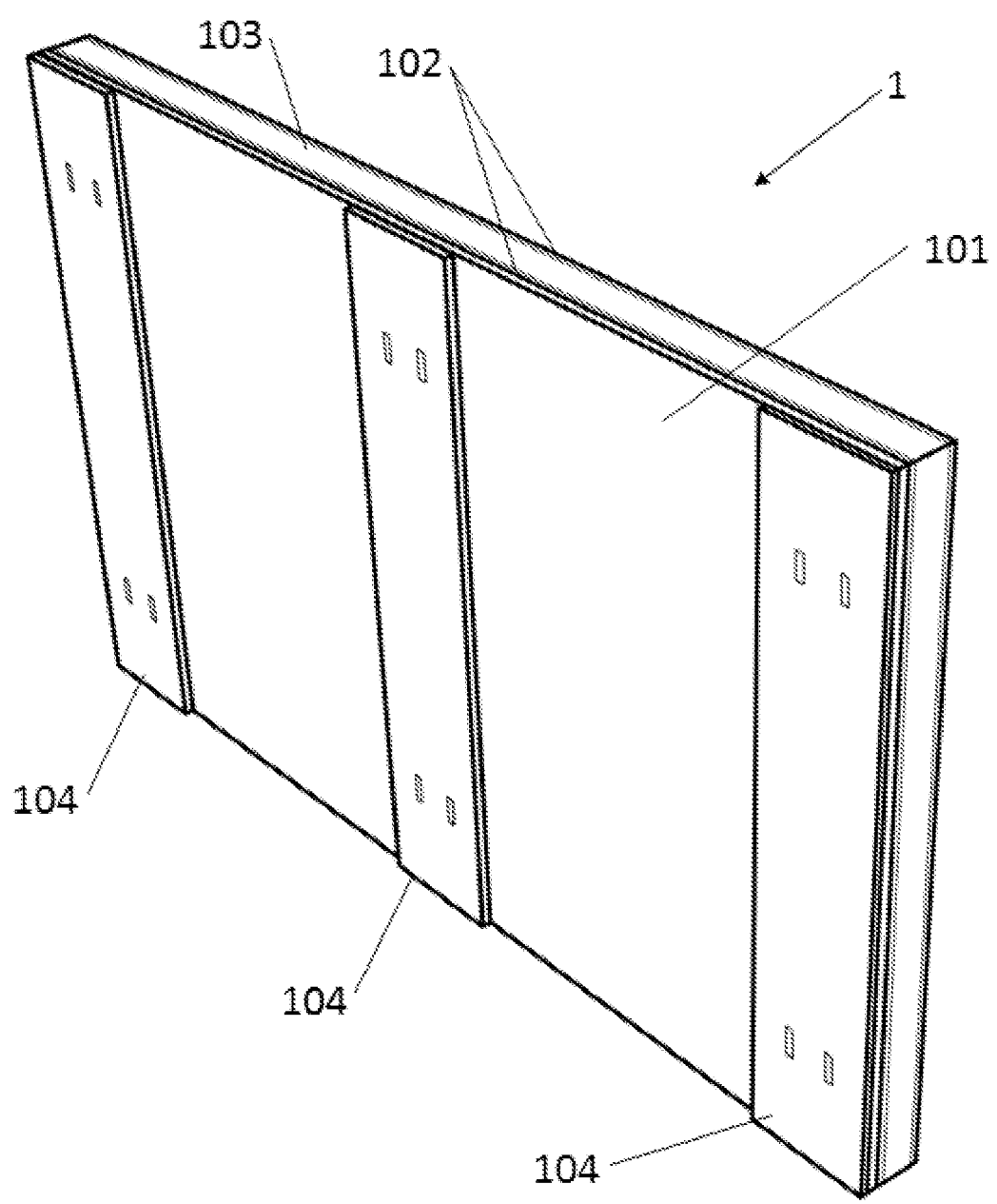
FIG. 5 is a perspective view of a fixed panel of the set of protection panels of the present invention.
Figure 6:
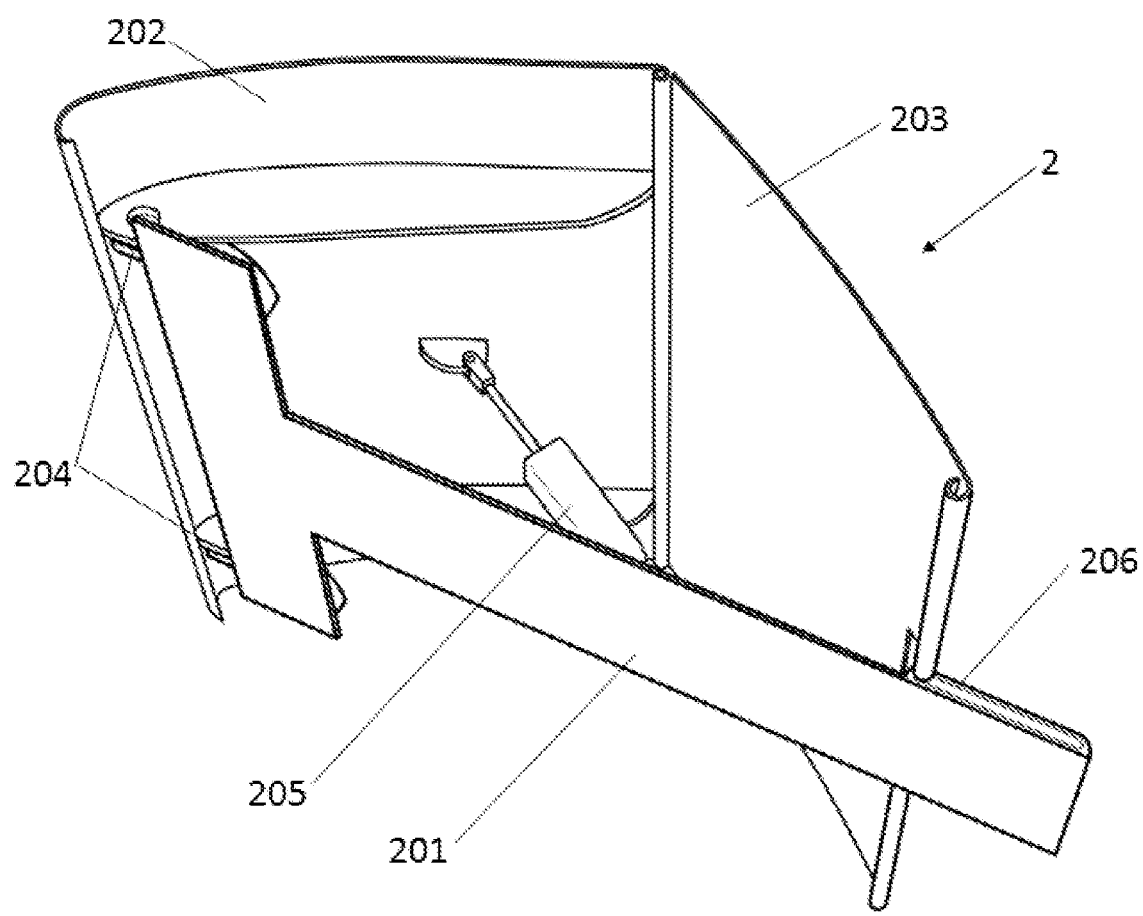
FIG. 6 is a perspective view of a mobile mechanical inner panel of the set of protection panels of the present invention.
Figure 7:
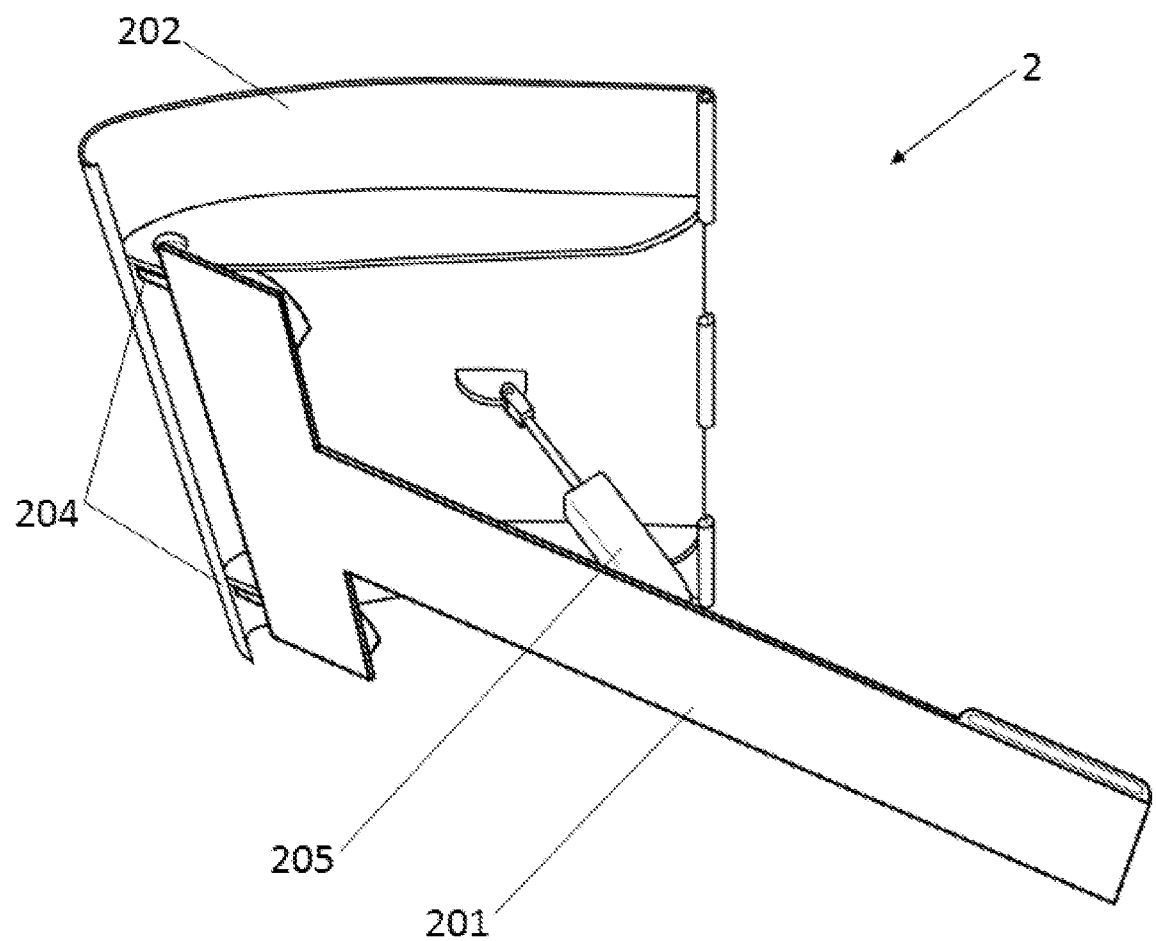
FIG. 7 is a perspective view of a mobile mechanical outer panel of the set of protection panels of the present invention.

The invention will now be described in detail with reference to the figures attached hereto. Said figures illustrate a preferred way of carrying out the invention, and are not intended to limit the scope of the invention as established by the claims.

The set of panels for protecting livestock of the present invention is intended to be used in a livestock-transporting lorry having a transport cage (3), comprising at least one set of railings (301), and at least one guillotine-type door (302).

In a preferred embodiment of the present invention, the set of panels for protecting livestock comprises:
1—a plurality of fixed panels (1), arranged on the inner walls of the cage, and
2—four mobile panels (2), arranged on the sides of the guillotine door.

Fixed Panels

The fixed panels (1) are partially elastic, impact-absorbing panels or plates that protect the livestock inside the cage (3), thus preventing the animals from being injured when bumping against the cage railings (301).

Each fixed panel (1) is a flexible multi-layer assembly having a rigid backing, comprising a backing plate made of rigid material (101), preferably plastic, and an assembly made of composite flexible material, fixed to the rigid-material plate. In a preferred embodiment of the present invention, the material used in the rigid-material plate is recycled plastic, and the assembly of composite flexible material comprises two micro rubber layers or plates (102) and a recycled rubber layer or plate (103) between them.

The backing plate made of rigid material (101) also comprises, on the side facing the cage railings (301), a plurality of vertical slats (104), which provide the supporting and attachment surface for the fixed panel (1) against those railings (301). The vertical slats (104) serve two purposes: increasing the plate (1) thickness at the points where it is attached to the railings (301), and creating a vent gap or space between the rigid-material backing plate (101) and the railings (301), so as to prevent wash water or rainwater build-up.

The fixed panels (1) are arranged horizontally one after the other along the inner side of the cage railings (302) forming a strip or band at such a height that it will protect the areas around the animals' hips, ribs and shoulders. Said plurality of panels is secured to the inside of the cage through appropriate securing means. In a preferred embodiment of the present invention, such securing means comprise stainless-steel screws. Therefore, in an embodiment of the present invention, the fixed panels (1) outer surfaces, which are the surfaces facing the cage (3) railing (301), comprise a plurality of holes (not shown) arranged in groups of two or more at the ends and at the middle, wherein said stainless-steel screws are secured by screwing them through the railing (301), from the outer side thereof. These screw holes are arranged in groups of two or more so that, when the fixed panels (1) are mounted to the cage (3), the poles of the railing (301) located on the outer side thereof can be avoided by selecting the hole that remains visible.

Mobile Panels

The mobile panels (2) are mechanical pivoting devices that protect the livestock from bumping against the edges of the guillotine door (302) when the animals are guided towards the door. The mobile panels (2) are arranged in pairs, two inner panels inside the cage and two outer panels outside the cage, on both sides of the guillotine door (302).

In a preferred embodiment of the present invention, each of the mobile panels (2) comprises a mounting plate (201), one wing or two wings (202, 203) that pivot about anchors (204) on the mounting plate, and a pneumatic cylinder (205) which drives said one or two wings (202, 203) so that the mobile panels can adopt a folded or an unfolded position.

The two outer mobile panels comprise a single wing (202), while the two inner mobile panels comprise two wings, a first wing (202) and a second wing (203), the second wing (203) being linked to and articulated with the first wing (202) at one end, and being linked by means of a slider (206) to the mounting plate (201) at the other end. In all the mobile panels, the pneumatic cylinder is linked to the mounting plate (201) at one end, and to the first or single wing (202), at the other end.

In a preferred embodiment of the present invention, the wings (202) and (203) are steel sheets.

Operating the pneumatic cylinder (205), which is linked to the wing (202), drives the pivoting movement of the wing and, in the case of the inner assemblies, which have two wings, a first wing (202) and a second wing (203), the pneumatic cylinder (205) drives the pivoting movements of both wings (202, 203), since the wings are linked to each other.

The inner and outer mobile panels (2) are arranged symmetrically on the respective inner and outer surfaces of the cage railing (301), on both sides of the guillotine door (302), and they are secured to each other by their mounting plates (201), through the cage railing (301), using appropriate securing means (not shown), such as screws. The inner and outer mobile panels (2) are arranged on the sides of the guillotine door (302) so that the edges of the articulated wings (202) thereof are parallel and cover the edge of the metal guide that forms the guillotine door (302) frame.

In a preferred embodiment of the present invention, the pneumatic cylinders (205) are driven by the compressed-air system of the transport lorry itself, and they are operated manually by means of a sealed control board (not shown) containing the mobile panel (2) operating controls, and the switches for the guillotine door (302) locking systems (not shown).

Set of Protection Panels Operation

Prior to beginning the livestock loading or unloading operation in the cage (3), the guillotine door (302) is in the closed position, and the mobile panels (2) are in the folded position. When the operation begins, the guillotine door (302) is opened to a fully open position, and a suitable locking system (not shown) is automatically applied, so that the guillotine door is not closed by accident while the wings of the mobile panels (2) are unfolded. Additionally, said locking system sends out an 'activated lock' signal to the sealed control board. While the 'activated lock' signal is active, the sealed control board is used to manually operate the mobile panels (2) which unfold the wings (202, 203) to an unfolded position. While the wings are in the unfolded position (202, 203), the sealed control board activates a lock which prevents the locking system of the guillotine door (302) from being deactivated, thus preventing the guillotine door from accidentally closing on the unfolded wings (202, 203). Afterwards, the usual animal loading or unloading operations are carried out. Once the operation is completed, the mobile panels (2) are operated by means of the sealed control board, so that they fold the wings (202, 203) to the folded position. Next, the locking system is released, and the guillotine door (302) is closed.

During transport, the fixed panels (1) protect the animals from impacts against the railings (301) of the cage (3), absorbing these impacts with their flexible plates or sheets (102, 103).

The fixed panels (1) and the mobile panels (2) can be washed using pressure water, as in the washing methods normally used in cages (3) for carrying livestock. Additionally, the set of protection panels is maintenance-free.

The invention claimed is:

1. A set of panels for protecting livestock during transportation, for use in a lorry with a cage for carrying livestock having railings and a guillotine door, said set of protection panels comprising:
a plurality of fixed panels, and
four mobile panels,
wherein the fixed panels comprise one or more layers of flexible material and a backing plate made of rigid material, to be arranged forming a horizontal strip along the inner walls of the cage railings, and
wherein the mobile panels comprise pivoting wings that can adopt a folded and an unfolded position, to be arranged on the sides of the guillotine door, two in the inside of the cage and two on the outside thereof.

2. The set of protection panels according to claim 1, wherein the backing plate made of rigid material is a recycled plastic plate, and the one or more layers of flexible material comprise a layer of recycled rubber arranged between two plates of micro rubber.

3. The set of protection panels according to claim 1, wherein each fixed panel comprises a plurality of vertical slats arranged between the rigid material backing plate and the inner walls of the cage railings.

4. The set of protection panels according to any of the previous claim 1, wherein each of the mobile panels comprises a mounting plate, a pivoting wing, and an actuator, wherein the mounting plate is fastened to the cage railing by suitable securing means, the wing is linked at one end in a pivoting way to the mounting plate by anchors, and the actuator is linked to the mounting plate and the wing, thus driving the pivoting movement thereof.

5. The set of protection panels according to claim 4, wherein each of the mobile panels arranged in the inner side of the cage additionally comprises a second pivoting wing, linked at one end in a pivoting way to the first pivoting wing, and linked at its other end to the mounting plate by a slider.

6. The set of protection panels according to claim 4, wherein the actuator is a pneumatic cylinder driven by a compressed-air system.

7. The set of protection panels according to claim 6, wherein the compressed-air system that drives the pneumatic cylinder is a compressed-air system that is part of the lorry itself.

8. The set of protection panels according to claim 1, wherein the guillotine door and the mobile panels are operated by means of a sealed control board.

9. The set of protection panels according to claim 1, wherein an 'activated lock' signal which is sent out while the guillotine door is opened prevents the guillotine door from closing when the mobile panels are in the unfolded position.

10. A vehicle for transporting livestock, comprising a cage for transporting livestock and a set of panels for protecting livestock according to claim 1.

* * * * *